June 21, 1960 J. C. DYGERT ET AL 2,941,621
CENTRIFUGAL SEPARATORS
Filed July 19, 1957

INVENTORS:
JUSTIN C. DYGERT
CLARKE L. COLDREN
BY: Oswald H. Milmore
THEIR ATTORNEY

United States Patent Office 2,941,621
Patented June 21, 1960

2,941,621

CENTRIFUGAL SEPARATORS

Justin C. Dygert, Walnut Creek, and Clarke L. Coldren, Lafayette, Calif., assignors to Shell Oil Company, a corporation of Delaware Filed July 19, 1957, Ser. No. 673,027

9 Claims. (Cl. 183—92)

This invention relates to centrifugal separators of the type employing a plurality of tubular separators mounted within a single casing for parallel-flow operation, e.g., for removing catalyst particles from hydrocarbon vapors or from combustion products, or for separating dust from air.

It is known to mount a number of small-diameter tubular separators within a casing having an inlet chamber from which the particle-ladened gas is supplied to the several separators and a clean-gas outlet chamber into which the separators discharge, the separators having outlets through which the separated particles are discharged together with a minor fraction, e.g., 1–10%, of the gas, herein called blow-down gas. For attaining the greatest effectiveness it is important that the several separators operate without mutual interference and under substantially like conditions; more particularly, it is important that the same quantities of blow-down gas are discharged. Because of usual variations in the separators caused by manufacturing tolerances, the pressures within the tubes immediately adjoining the particle- and gas-outlets are not the same, with the result that there is a tendency for large variations in the quantities of blow-down gas that would flow from the several separators if they discharged immediately into a common collecting chamber. This tendency has heretofore required the use of a separate blow-down pipe for each separator, which conducts the particles and gas from the several separators into a common collecting chamber and promotes uniform flows by imposing flow resistance.

Further, it is desirable to mount the tubular centrifugal separators in closely adjacent relations to conserve space, and to locate each particle- and gas-outlet at the side of the centrifugation tube, e.g., in the form of a circumferential slit near the closed end, i.e., immediately adjacent or spaced a small distance from the end. Such a mounting is difficult to achieve when separate blow-down pipes are used because of the crowding of parts; on the other hand, the simple lateral discharge from such slits into a common collecting chamber has not heretofore been feasible due to mutual interference of the discharge streams. Thus, the particulate and/or the gaseous material discharged from one separator tube may hinder the free discharge from an adjoining tube and may even be projected into the slit of the adjoining tube, particularly when the adjoining tubes do not operate under identical conditions, a situation which is likely due to imperfections in manufacture, as noted above, and/or due to differences in aerodynamic resistances of the paths through the inlet chambers to the respective separator inlets.

Another problem encountered in such devices relates to the possibility of clogging the inlet pipe and/or the separators during start-up. In many applications the gas being cleaned is at elevated temperature and contains condensible matter, such as steam, which remains in the gaseous state during normal operation. However, when the unit is first put on stream the casing, partitions and separator tubes are cold and the gas stream can be cooled sufficiently to condense moisture to form a slurry with the suspended particles. Such a slurry can obstruct the flow passages resulting, for example, in non-uniform distribution of gas to the several separators and/or partial to total blocking of some of the outlet slits and blow-down pipes.

It is, therefore, an object of the invention to provide an improved centrifugal separator of the type employing a plurality of small tubular centrifugal separators, wherein the need for the blow-down pipes is eliminated and wherein the separated particles and blow-down gas are discharged directly into a common collecting chamber in such a manner that the several separators can be operated effectively without mutual interference.

A further object is to provide an improved centrifugal separator of the type indicated above wherein condensed matter can be drained off.

Additional objects are to improve the gas-flow arrangement so as to permit several clean-gas discharge nozzles to be mounted on one side of the casing, and to mount the centrifugal separators in a manner to permit thermal expansion and contraction.

In summary, the several separator tubes, having circumferential slits through which the particles and blow-down gas are discharged, are provided with skirts which surround the tubes opposite the slits in closely spaced relation to provide annular discharge passages which discharge directly into a common collecting chamber.

Further, the lower portions of the tubular separators and/or the inlet by which the particle-ladened gas is charged into the inlet chamber, are provided with drain tubes that extend out through the casing and have shut-off valves which may be opened at the start-up of the unit to remove condensed moisture which would, if left in the apparatus, tend to clog it.

A baffle extending in axially spaced relation to the clean-gas outlets of the tubular separators is mounted within the clean-gas outlet chamber and a plurality of outlets for this chamber can then be provided near the baffle on one side of the casing.

To permit thermal expansion and contraction the inner and outer tubes of the centrifugal separators are preferably free for relative axial movement and respectively fixed to different portions of the casing.

The invention will be further described with reference to the accompanying drawing forming a part of this specification and showing, by way of illustration, one preferred embodiment, wherein.

Figure 2:
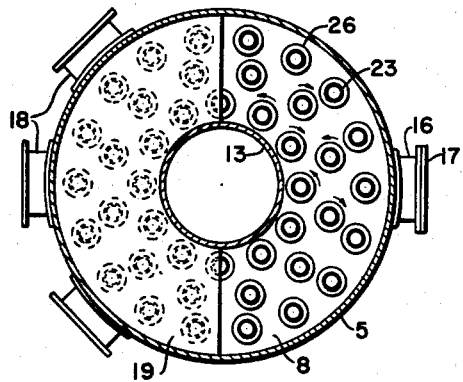
Figure 2 is a transverse sectional view, taken on the line 2—2 of Figure 1.

Referring to the drawings in detail, the apparatus comprises a casing 5 having an upper cylindrical section and a frusto-conical bottom section 6 which is connected to a smaller base section 7. The casing contains upper and lower transverse partitions 8 and 9 which divide the casing into an upper clean-gas outlet chamber 10, an intermediate inlet chamber 11 and a lower collecting chamber 12. An inlet duct 13 extends downwardly through the top of the casing and through the partition 8 at the central axis and is provided at the bottom with a distributor bottom 14 which forms a sump below the bottom of the inlet chamber 11. The duct 13 has side openings preferably covered by screens 15 for the passage of the inlet gas, burdened with solids, from the duct into the inlet chamber. Coarse particles are prevented by these screens from entering the inlet chamber and fall into the sump. The casing is further provided at the top with a manway 16, closed by a closure plate 17, and one or more outlet nozzles 18 through which clean gas is discharged from the chamber 10. A sector-shaped baffle 19, extending over 180°, is mounted just beneath the outlet nozzles 18 to promote uniform pressure over the area of the partition 8 and to insure equal pressures at the discharge nozzles 18. The base section 7 has an outlet nozzle 20 through which separated particles and blow-down gas are removed from the collecting chamber.

Figure 3:
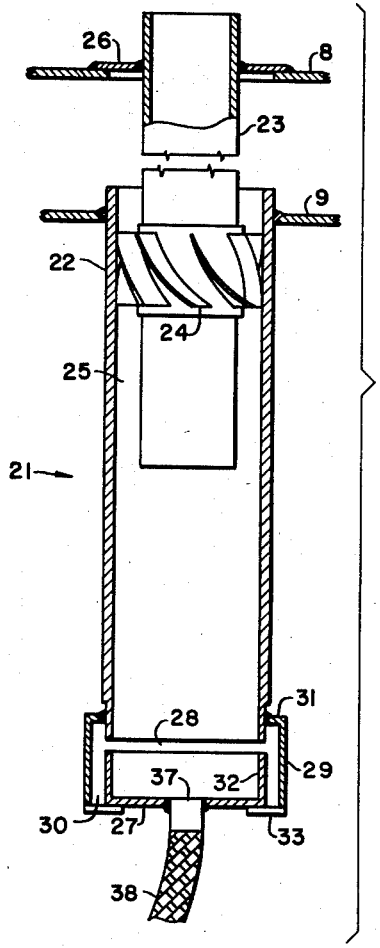
Figure 3 is an enlarged vertical sectional view through one of the tubular centrifugal separators.
Figure 1:
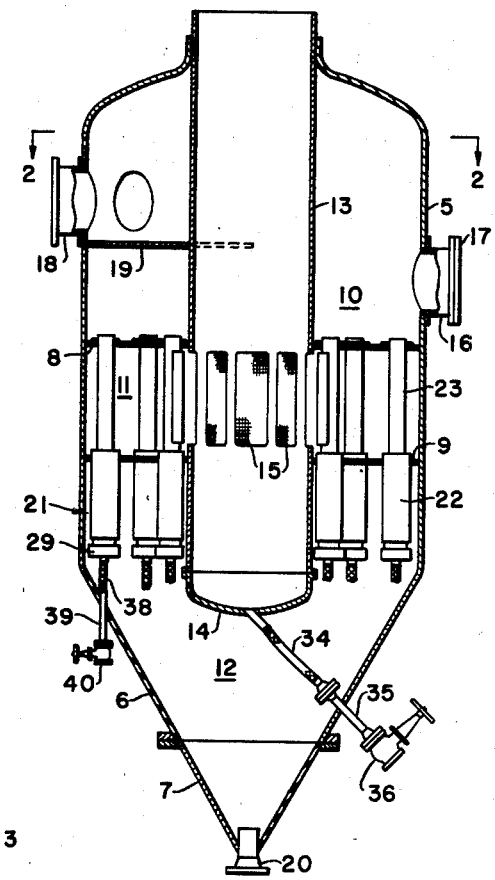
Figure 1 is a vertical sectional view through the complete apparatus.

A plurality, e.g., forty-two, tubular centrifugal separators 21 are mounted with their axes vertical in closely adjacent relation about the inlet duct 13. As shown more particularly in Figure 3, each separator includes an outer tube 22 which extends downwards in sealed relation through a hole in the partition 9 and has the lower part thereof hermetically embouchured within the collecting chamber 12, e.g., by weldments to the partition 9. The separator further includes an inner tube 23 of lesser diameter than and concentrically within the outer tube and extending upwards through a hole in the partition 8, and swirl vanes 24 welded to the tube 23 and situated in the annular space between the inner and outer tubes, which impart a swirling motion to gas which flows downwards into the annular centrifugation space 25 between the tubes. Each tube 23 has an annular support plate 26 welded thereto and resting on the partition 8, the swirl vanes 24 being slidable within the outer tube. During assembly the several tubes 22 are first welded to the partition 9 and the inner tubes 23 are thereafter slid into the holes in the partition 8, with their inner ends within the tubes 22; the plates 26 are then welded to the partition 8 to effect hermetic seals. Each tube has a bottom closure 27 and a circumferential slit 28 for the discharge of particles and blow-down gas. The slit 28 is near the closure 27, e.g., immediately adjacent thereto or preferably spaced above it by a distance up to one diameter, as shown. The inner (bottom) end of the tube 23 is above the level of the slit. A skirt 29 surrounds the slit in closely spaced radial relation to the tube to provide an annular discharge passage 30 which is freely open at the bottom and which is joined to the tube above the slit by an annular section 31. The lowermost part 32 of the tube, situated below the slit, is supported from the skirt by radial fingers 33.

The bottom 14 is provided with a central opening to which is fitted a drain conduit 34 which is advantageously flexible and extends downwards out of the casing via a rigid coupling extension tube 35, the latter is provided with a shut-off valve 36. Similarly, each of the bottom closures 27 has a central hole 37 to which is connected a flexible drain conduit 38 extending downwards out of the casing via a rigid coupling extension tube 39 and provided with a shut-off valve 40.

In operation, the feed gas, containing suspended particles, is admitted through the inlet duct 13 and flows radially out through the screens 15 into the inlet chamber 11, together with particles small enough to pass the screen. The gas thence enters the several tubes 22, assuming a swirling motion upon passing the vanes 24, whereby the particles are hurled by centrifugal force against the wall of the outer tube, both within the annular passage 25 and below the bottom of the inner tube 23. The central core of clean gas is discharged through the inner tube into the outlet chamber 10, from which it is discharged via the outlet nozzles 18. The separated particles descend to the bottoms of the tubes and are discharged together with blow-down gas through the slits 28 and the annular passages 30 downwards into the collecting chamber 12. The particles and blow-down gas are discharged through nozzle 20. The skirts 29 prevent the material discharged from one separator tube from being blown into the slits of and otherwise interfering with the independent operation of the adjoining tubes, and therefore functions as a fluid dynamic de-coupling element. Moreover, the annular passage 30 imposes a flow resistance and thereby further aids to de-couple the several separators, in addition to aiding in equalizing the amounts of blow-down gas discharge from the several separators.

It is evident that the constructions, in obviating the need for long blow-down pipes, permits the close spacing of the separator tubes and reduces piping costs.

When the apparatus is started up while cold and the feed gas contains condensible matter, the valves 36 and 40 are opened during the start-up period to drain off condensed liquid, together with solid, which would otherwise tend to clog the apparatus. After the apparatus has been heated these valves are closed. Solid particles which are too large to pass the screens 15 are also discharged from time to time through the drain conduit 34. It should be noted that the drain conduits 38 are especially useful when the discharge slits 28 are situated in spaced relation above the bottom closures 27 and may be omitted when these slits adjoin the closure.

The baffle plate 19 promotes equal flow of gas among the several separator tubes and also among the several outlet nozzles 18, although these are all located on one side of the casing. This arrangement is particularly advantageous when the clean gas is conducted to a series of units, e.g., combustion turbines, which are located on a common side of the casing. Without such a baffle it would be necessary to distribute the nozzles equidistantly about the casing, e.g., 120° apart, for insuring uniform flow; this necessitates additional piping.

Uniform operation of the separators 21 and uniform gas distribution among the nozzles 18 is further promoted by inclining the swirl vanes 24 of adjoining separators oppositely, so as to effect rotation in opposite circumferential directions as indicated by the arrows in Figure 2. This preferred arrangement insures that there is no net rotational momentum in the clean gas discharged into the outlet chamber 10; this minimizes the tendency of the gas to sweep the baffle plate 19 with a rotational movement. Similarly, the blow-down gas which enters the collecting chamber 12 does not set up undesirable rotational currents.

It will be noted that the outer and inner tubes 22 and 23, respectively, of the separators are relatively movable in the axial direction and are carried respectively by the lower and upper partitions 9 and 8. In addition to facilitating installation, this construction relieves stress due to unequal thermal expansion and contraction. Thus, when the spacing between the partitions 8 and 9 changes, due to heating or cooling of the parts, these tubes can undergo relative axial movements.

We claim as our invention:

1. Apparatus for cleaning a gas comprising: a casing containing partitions defining within the casing a gas inlet chamber, a clean-gas outlet chamber and a particle collecting chamber; an inlet for admitting a gas burdened with particles into said inlet chamber; outlets for said outlet and collecting chambers; and a plurality of centrifugal separators disposed within said casing adjacently to one another, each asid separator including a tube having at least one end thereof situated within the collecting chamber and having a gas inlet in communication with the inlet chamber, a clean-gas outlet discharging into the outlet chamber and a particle- and gas-outlet near said one end of the tube discharging into the collecting chamber, the last-mentioned outlet including a circumferential slit in the part of the tube within the collecting chamber, and means for decoupling the said separators fluid-dynamically, said decoupling means including a flow-restrictive element adjoining the said slit disposed to impart flow resistance to gas passing from the separator tube to the collecting chamber.

2. Apparatus for cleaning a gas comprising: a casing containing partitions defining within the casing a gas inlet chamber, a clean-gas outlet chamber and a particle collecting chamber; an inlet for admitting a gas burdened with particles into said inlet chamber; outlets for said outlet and collecting chambers; and a plurality of centrifugal separators disposed within said casing adjacently to one another, each said separator including a tube having at least one end thereof situated within the collecting chamber and having a gas inlet in communication with the inlet chamber, a clean-gas outlet discharging into the outlet chamber and a particle- and gas-outlet near said one end of the tube discharging into the collecting chamber, the last-mentioned outlet including a circumferential slit in the part of the tube within the collecting chamber, and an annular skirt surrounding said slit in close radially spaced relation to the tube and defining therewith an annular discharge passage which is in direct communication with said collecting chamber.

3. Apparatus for cleaning a gas comprising: a casing containing partitions defining within the casing a gas inlet chamber, a clean-gas outlet chamber and a particle collecting chamber, said collecting chamber being situated beneath the two first-mentioned chambers; an inlet for admitting a gas burdened with particles into said inlet chamber; outlets for said outlet and collecting chambers; a plurality of centrifugal separators disposed within said casing, adjacently to one another, each said separator including a substantially vertical tube having the lower end thereof hermetically embouchured in the collecting chamber and having a gas inlet in communication with the inlet chamber, a clean-gas outlet discharging into the discharge chamber, and a solids- and gas-outlet in the lower end thereof, the last-mentioned outlet including a circumferential slit in the part of the tube within the collecting chamber, and an annular skirt surrounding said tube in close radially spaced relation and defining therewith an annular discharge passage which is in free communication at the lower end thereof with the collecting chamber.

4. Apparatus according to claim 3 wherein said skirt includes at the top thereof an annular portion engaging said tube and closing the upper end of said annular discharge passage.

5. A tubular centrifugal separator including: an outer tube having a closure at one end and a circumferential particle- and gas-outlet slit near to but spaced axially outwards from said closure; a clean-gas discharge tube of lesser diameter than and disposed concentrically at least partly within said outer tube and defining an annular centrifugation chamber between the two tubes, the inner end of the discharge tube being located short of said discharge slit; means for admitting a gas, burdened with particles, with a swirling motion into said annular chamber for flow toward said inner end of the discharge tube; and an annular skirt surrounding the tube in close radially spaced relation at the said slit and defining therewith an annular discharge passage which is open in the axial direction of the closure, said skirt being joined to the tube beyond the slit in the opposite axial direction.

6. Apparatus for cleaning a gas comprising: a casing containing partitions defining within the casing a gas inlet chamber, a clean-gas outlet chamber and a particle collecting chamber; an inlet for admitting a gas burdened with particles into said inlet chamber; outlets for said outlet and collecting chambers; a plurality of centrifugal separators disposed within said casing, each said separator including a gas inlet in communication with the inlet chamber, a clean-gas outlet discharging into the collecting chamber, a particle- and gas-outlet discharging into the collecting chamber, and a bottom closure; and a drain conduit connected to at least one of said bottom closures and communicating through an opening in said closure within the separator, said conduit extending out through said casing and being provided with a shut-off valve.

7. Apparatus for cleaning a gas comprising: an upright casing; partitions within the casing defining therein a gas inlet chamber, a clean-gas outlet chamber and a particle collecting chamber, said collecting chamber being situated beneath the two first-mentioned chambers; an inlet for admitting gas burdened with particles into said inlet chamber including an inlet duct extending downwardly into the casing through the central part thereof adjacently to said inlet chamber and having peripherally distributed passageways communicating with said inlet chamber, said inlet duct including a sump disposed below the bottom of the inlet chamber; screening means for said passageways for the influx of gas and small particles into said inlet chamber; a drain conduit connected to the bottom of said inlet duct through an opening in said sump, said drain conduit extending out of the casing and being provided with a shut-off valve; and a plurality of tubular centrifugal separators disposed within the casing surrounding said inlet duct, each said separator including a tube having an inlet in communication with said inlet chamber, a clean-gas outlet discharging into said discharge chamber, and a solids- and gas-outlet at the bottom discharging into said collecting chamber.

8. Apparatus according to claim 7 wherein said tubes have bottom closures and said particle- and gas-outlets are situated in spaced relation above said closures, each tube having a drain duct communicating with the bottom of the tube through an opening in the respective closure and each said drain duct extending out of the casing and being provided with a shut-off valve.

9. Apparatus for cleaning a gas comprising: a casing containing upper and lower transverse partitions defining within the casing a gas inlet chamber, a clean-gas outlet chamber above said partitions, and a particle collecting chamber; an inlet for admitting a gas burdened with particles into said inlet chamber, an outlet for said collecting chamber; a plurality of clean-gas outlets communicating with said outlet chamber through the side of said casing in a common sector thereof; a plurality of centrifugal separators disposed within said casing, each said separator including a gas inlet in communication with the inlet chamber, a clean-gas outlet discharging into the collecting chamber, and a particle- and gas-outlet discharging into the collecting chamber; and a transverse baffle within the outlet chamber extending transversely between said clean-gas outlets of the separators and said clean-gas outlets of the outlet chamber over the major part of said sector and leaving a flow passage outside said sector for the flow of gas from all of the separator clean-gas outlets to all of said chamber clean-gas outlets.

References Cited in the file of this patent

UNITED STATES PATENTS

| 1,161,263 | Spencer | Nov. 23, 1915 |
| 1,333,325 | McGee | Mar. 9, 1920 |
| 2,016,641 | Lincoln | Oct. 8, 1935 |
| 2,069,483 | Skaaja | Feb. 2, 1937 |
| 2,341,087 | Dunham | Feb. 8, 1944 |
| 2,346,005 | Bryson | Apr. 4, 1944 |
| 2,461,677 | Burdock et al. | Feb. 15, 1949 |
| 2,489,903 | Kraft et al. | Nov. 29, 1949 |
| 2,646,133 | Schutt | July 31, 1953 |
| 2,773,598 | Castellani | Dec. 11, 1956 |
| 2,799,355 | Easton | July 16, 1957 |
| 2,804,171 | Yellott et al. | Aug. 27, 1957 |
| 2,812,828 | Yellott et al. | Nov. 12, 1957 |

FOREIGN PATENTS

| 555,908 | Great Britain | Sept. 13, 1943 |
| 119,075 | Sweden | Apr. 24, 1947 |
| 1,098,259 | France | Mar. 2, 1955 |
| 1,106,384 | France | July 20, 1955 |